(12) United States Patent
Hilliard

(10) Patent No.: US 11,111,948 B2
(45) Date of Patent: Sep. 7, 2021

(54) AIRCRAFT ASSEMBLY

(71) Applicant: SAFRAN LANDING SYSTEMS UK LTD, Gloucester (GB)

(72) Inventor: Matthew Hilliard, Gloucester (GB)

(73) Assignee: Safran Landing Systems UK LTD

( * ) Notice: Subject to any disclaimer, the term of this patent is extended or adjusted under 35 U.S.C. 154(b) by 266 days.

(21) Appl. No.: 16/392,721

(22) Filed: Apr. 24, 2019

(65) Prior Publication Data
US 2019/0331156 A1    Oct. 31, 2019

(30) Foreign Application Priority Data

Apr. 25, 2018   (EP) .................................... 18169264

(51) Int. Cl.
| F16B 33/02 | (2006.01) |
| B21H 3/02 | (2006.01) |
| B64C 25/36 | (2006.01) |
| B64C 25/58 | (2006.01) |
| F16B 7/18 | (2006.01) |
| F16B 39/34 | (2006.01) |

(52) U.S. Cl.
CPC .............. *F16B 33/02* (2013.01); *B21H 3/02* (2013.01); *B64C 25/36* (2013.01); *B64C 25/58* (2013.01); *F16B 7/18* (2013.01); *F16B 39/34* (2013.01); *B23G 2225/44* (2013.01)

(58) Field of Classification Search
CPC .......... F16B 7/18; F16B 33/00; F16B 33/008; F16B 33/02; F16B 37/00; F16B 37/02; F16B 37/0864; F16B 39/34; B21H 3/02
USPC ....................... 411/366.1, 383, 427, 432, 433
See application file for complete search history.

(56) References Cited

U.S. PATENT DOCUMENTS

| 657,297 | A | * | 9/1900 | Sheffield | ................. | F16B 37/12 411/262 |
| 2,150,875 | A | * | 3/1939 | Caminez | ................. | F16B 37/12 29/456 |
| 2,262,450 | A | * | 11/1941 | Camines | ................. | F16B 37/12 411/282 |
| 2,382,748 | A | * | 8/1945 | Schuttler | ................. | F16B 33/02 411/432 |

(Continued)

FOREIGN PATENT DOCUMENTS

GB    2482517 A    2/2012

OTHER PUBLICATIONS

Extended European Search Report for European Application No. 18 169 264.1, dated Oct. 17, 2018—7 pages.

*Primary Examiner* — Roberta S Delisle
(74) *Attorney, Agent, or Firm* — RatnerPrestia

(57) ABSTRACT

An aircraft assembly having a titanium rod comprising a first threaded portion, and a titanium nut comprising a second threaded portion conforming with the first threaded portion for mating engagement with it. One of the first and second threaded portions defines a male thread and the other one of the first and second threaded portions defines a female thread such that the nut can be wound in threading engagement along the rod. A threaded insert formed from a first metal of different hardness in comparison to titanium is coupled to the rod or the nut to define the first threaded portion or the second threaded portion respectively such that one of the first and second threaded portions is formed from titanium and the other one of the first and second threaded portions is formed from the first metal.

12 Claims, 2 Drawing Sheets

(56) References Cited

U.S. PATENT DOCUMENTS

| | | | | |
|---|---|---|---|---|
| 3,220,454 A | * | 11/1965 | Neuschotz | F16B 33/02 |
| | | | | 411/178 |
| 4,040,462 A | | 8/1977 | Hattan | |
| 5,452,977 A | * | 9/1995 | Terrizzi | F16B 33/004 |
| | | | | 411/82.5 |
| 5,961,266 A | * | 10/1999 | Tseng | F16B 37/12 |
| | | | | 411/289 |
| 6,406,240 B1 | * | 6/2002 | Potter | F16B 37/0864 |
| | | | | 411/267 |
| 6,789,993 B2 | * | 9/2004 | Ozawa | F16B 5/0233 |
| | | | | 411/432 |
| 7,802,953 B2 | * | 9/2010 | Stephen | F16B 37/12 |
| | | | | 411/246 |
| 8,061,945 B2 | * | 11/2011 | Smith | F16B 37/0857 |
| | | | | 411/267 |
| 8,540,471 B2 | * | 9/2013 | Dvorak | F16B 37/0821 |
| | | | | 411/433 |

* cited by examiner

AIRCRAFT ASSEMBLY

BACKGROUND

An aircraft assembly can comprise a threaded rod upon which a threaded nut is wound to secure a component.

It is desirable to minimise the mass of aircraft assemblies to increase the fuel efficiency of an aircraft.

The present inventor has identified that such an aircraft assembly can be improved in one or more of the following ways:
reduced weight
improved reliability
improved corrosion resistance

SUMMARY

In accordance with a first aspect of the invention, there is provided an aircraft assembly having a titanium rod comprising a first threaded portion; and a titanium nut comprising a second threaded portion conforming with the first threaded portion for mating engagement with the first threaded portion. One of the first threaded portion and the second threaded portion defines a male thread and the other one of the first threaded portion and the second threaded portion defines a female thread such that the nut can be wound in threading engagement along the rod. A threaded insert formed from a first metal of different hardness in comparison to titanium is coupled to the rod or the nut to define the first threaded portion or the second threaded portion respectively such that one of the first threaded portion and the second threaded portion is formed from titanium and the other one of the first threaded portion and the second threaded portion is formed from the first metal.

Thus, one of either the titanium nut or rod is arranged to receive a metallic insert that defines the threaded surface of it. The insert is formed from a metal having a different hardness in comparison to titanium in order to reduce the likelihood of galling as the nut is wound along the rod, thereby increasing reliability against cold welding of threads. This enables either one of the nut or rod to be formed from titanium and a majority of the other to be formed from titanium, thereby reducing the weight of the assembly relative to known assemblies.

In one optional embodiment, the threads of the titanium threaded portion are formed by a cold forging thread rolling process.

In another optional embodiment, the body of the nut or rod to which the insert is coupled is at least 80% of the volume of the nut or rod respectively.

In another optional embodiment, the insert defines the female threaded portion.

In another optional embodiment, the insert comprises a self-locking thread insert.

In another optional embodiment, the insert is formed from die drawn wire.

In another optional embodiment, the insert is formed from a copper nickel tin alloy comprising at least 75% by weight copper and at least 15% nickel and at least 5% tin.

In another optional embodiment, the first threaded portion, defined by the rod, defines the male threaded portion and the nut body defines a bore, the insert being located within the bore and defining the female threaded portion.

In another optional embodiment, the titanium rod comprises an aircraft landing gear axle.

In another optional embodiment, the rod defines a bore, the first threaded portion defines the female threaded portion within the bore and the nut is a gland nut defining the male threaded portion.

In another optional embodiment, the titanium rod comprises an outer cylinder of an aircraft landing gear shock absorbing strut.

In another optional embodiment, the insert is coupled to the rod.

In accordance with a further aspect of the invention there is provided an aircraft comprising one or more aircraft assemblies according to the first aspect.

BRIEF DESCRIPTION OF THE DRAWINGS

By way of example only, certain embodiments of the invention will now be described by reference to the accompanying drawings, in which.

DETAILED DESCRIPTION

Figure 1:
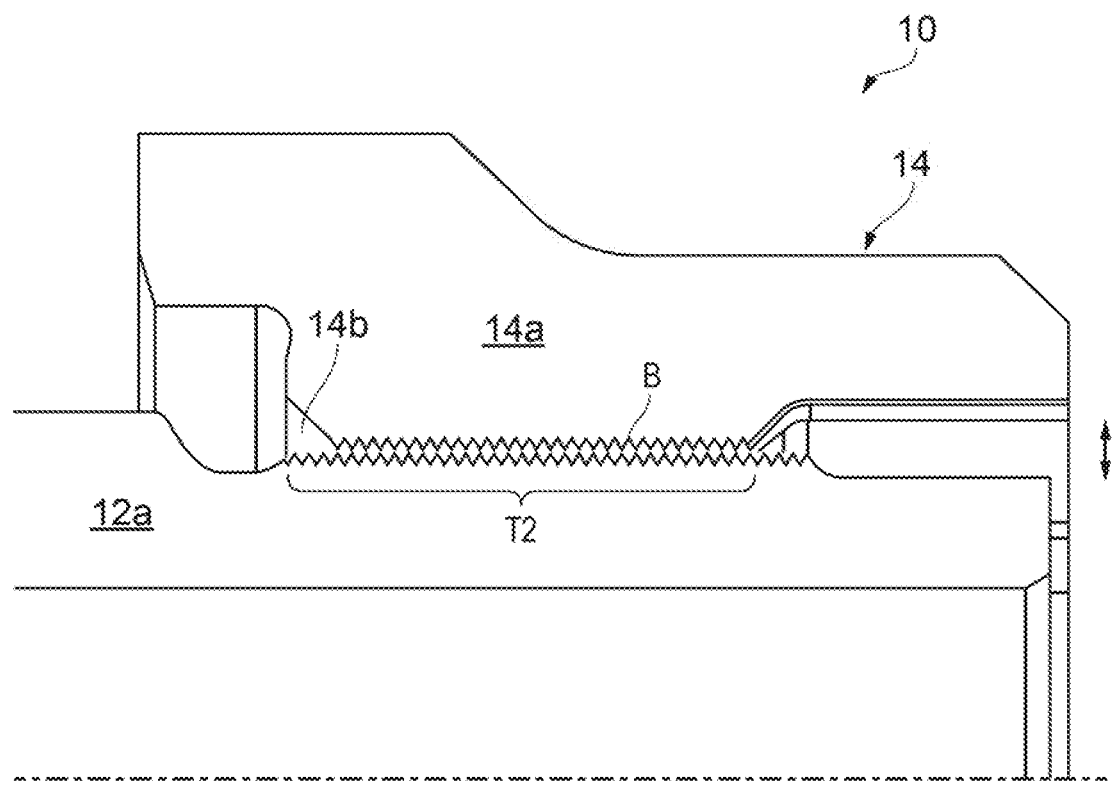
FIG. 1 is a cross section view of an aircraft assembly according to an embodiment of the invention.

FIG. 1 shows an aircraft assembly 10 according to an embodiment of the invention.

The aircraft assembly 10 comprises a threaded rod 12 and a threaded nut 14 wound on the rod 12 to retain a component (not shown).

Figure 2:
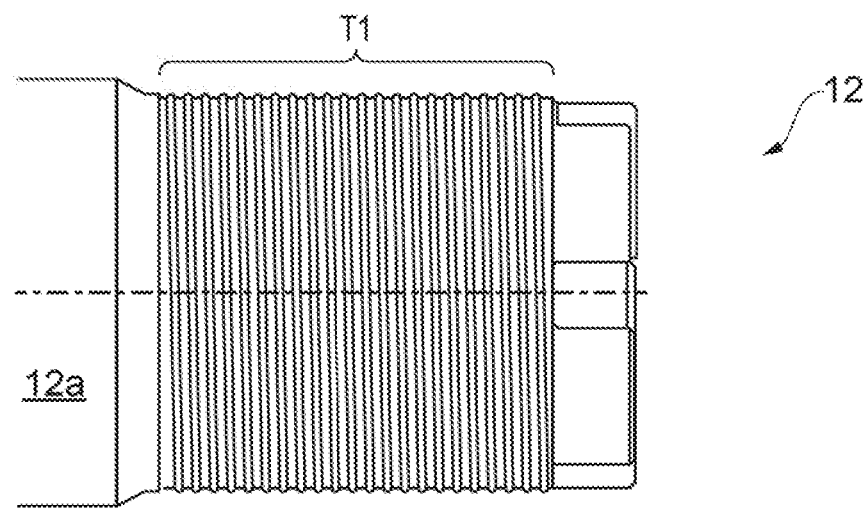
FIG. 2 is a side view of one end of the axle of the assembly of FIG. 1.

Referring additionally to FIG. 2, in this embodiment the threaded rod 12 is an aircraft landing gear assembly axle 12. The axle 12 is formed from titanium and has a tubular body 12a provided with an outwardly facing or male threaded surface T1.

The threads of the threaded surface T1 are preferably formed by a cold forming thread rolling process, whereby the rod 12a is plastically deformed to define the threads. This can result in threads with relatively smooth surfaces in comparison to threads formed by subtractive manufacturing thread forming processes such as cutting and grinding; as such, it can be determined by observing the threads under magnification whether they have been formed by a cold forging thread rolling process. A cold forging thread rolling process can reduce the likelihood of galling in an aircraft assembly as described herein.

As shown in FIG. 1, the nut 14 comprises a body 14a and an insert 14b. The insert 14b is a threaded bushing arranged to be inserted into the body 14a to define a threaded hole.

The body 14a is formed from titanium. The body 14a defines a central, cylindrical bore B which is open at one or both ends of the body 14a. The bore B is sized to receive the insert 14b.

The insert 14b is formed from a metal or a metal alloy having a different hardness in comparison to titanium. The metal can for example be a high strength copper nickel tin alloy, in one example comprising 77% by weight copper and around 15% nickel and 8% tin (ref. AMS4596). The inventor has found that using such an alloy for the insert can improve the corrosion resistance of the assembly. In other embodiments the insert can be formed from any suitable metal or alloy which has a different hardness than titanium and/or has low inherent friction and/or is galvanically compatible with titanium. It is preferred that the potential difference between the insert and contacting titanium surface(s) is of less than 0.25 volts, and preferably around 0.05 volts for corrosion resistance in wet environments.

The body 14a represents a majority of the volume of the nut 14; for example, the body 14a can represent at least 80% of the total volume of the nut 14 and preferably at least 85% or 90% of the total volume of the nut 14. Thus, a majority of the nut 14 is formed from titanium, which can minimise the mass of the nut 14. Put another way, although the insert 14b is likely to be formed from a metal or metal alloy which is relatively dense in comparison to titanium, weight contribution is limited due to the cross sectional size of the insert. This can make a nut 14 as described herein significantly lighter than a nut which is formed entirely of a metal or metal alloy having a different hardness in comparison to titanium. Also, the small nature of the insert means that it does not significantly increase the cross sectional size of the nut in comparison to a nut formed entirely from titanium.

The insert 14b is arranged to be retained within the bore B to define an inwardly facing or female threaded surface T2 of the nut 14, which conforms to the outwardly facing threaded surface T1 of the axle 12 such that the nut 14 can be wound along the axle 12 to retain a component such as a brake assembly (not shown) on the axle 12.

The insert 14b can be a self-locking thread insert, which can be wound into the bore and retained by way of an interference fit. In one example, the insert 14b can have outwardly facing threads (not shown) arranged to engage with inwardly facing threads defining the nut bore, the threads of the insert being arranged to define a mid-section change in thread geometry to define one or more grip coils arranged to provide a prevailing torque between the inert and the nut when the nut is unwound from the axle. Alternatively or in addition, a suitable thread locking fluid adhesive can be used to create a prevailing torque. In another example, the nut can include a shoulder or obstruction on the female thread to enable nut removal without rotation of the insert.

The inventor has found that an assembly having an insert as described herein can be lighter than known assemblies because the threaded rod can be formed entirely of titanium and a majority of the nut can be formed from titanium, while inhibiting the occurrence of galling between the rod and nut. The inventor found that an assembly according to the invention enables the nut to be applied and removed from the rod at high levels of retaining torque a greater number of times without galling occurring in comparison to an assembly having a titanium nut and rod with a dry lubricant coating applied to the threads.

Figure 3:
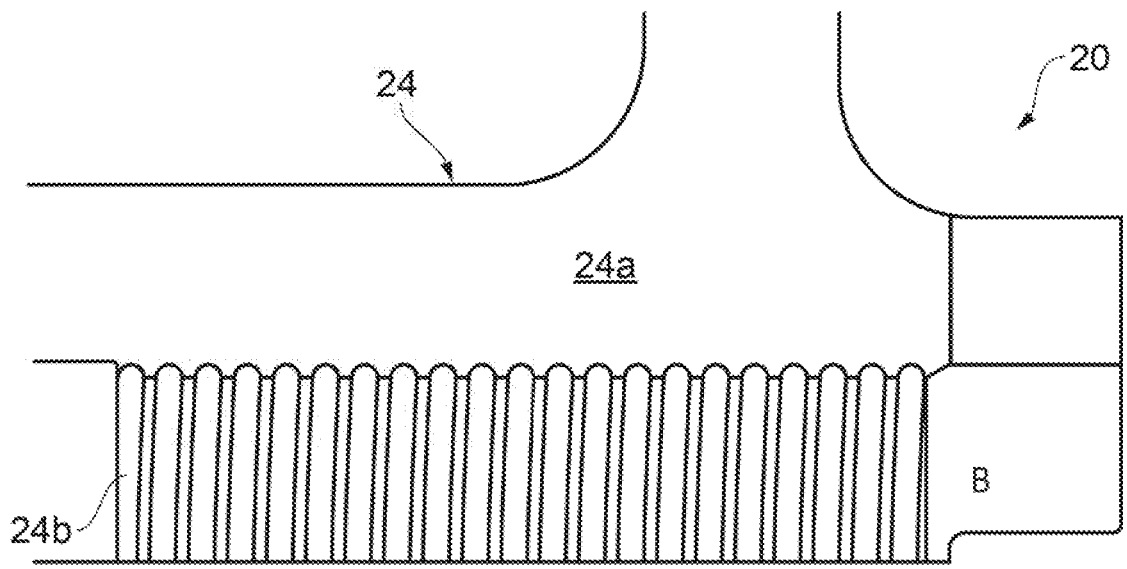
FIG. 3 is a cross section view of an aircraft assembly according to another embodiment, showing a nut with a die drawn metal insert defining a female thread.

In a further embodiment shown in FIG. 3, an aircraft assembly 20 can comprise a nut 24 having a body 24a of identical or similar construction to the body 14a of FIG. 1.

The insert 24b in this embodiment is a drawn metal wire insert formed into a helical coil arranged to be wound into the bore B. As will be appreciated, a drawn metal wire or rod is formed by pulling it under tension though a die to plastically deform it. The insert 24b can be formed from the same materials as the insert 14b of FIG. 1 and can be retained in the same manner.

The insert 24b advantageously has a relatively smooth thread defining profile in comparison to threads formed by subtractive manufacturing thread forming processes such as cutting and grinding; as such, it can be determined whether they have been formed by a cold forging drawing process by observing the threads under magnification. The inventor has found such an insert to further reduce the likelihood of galling in an aircraft assembly as described herein.

Moreover, the combination of a nut 24 with a drawn wire insert 24b and a threaded rod 14 with thread T1 formed by a cold forging thread rolling process results in an aircraft assembly in which the nut can be wound from and reapplied to the rod with reduced likelihood of galling in comparison to an assembly according to the invention in which the insert threads are formed by a subtractive manufacturing thread forming process.

Figure 4:
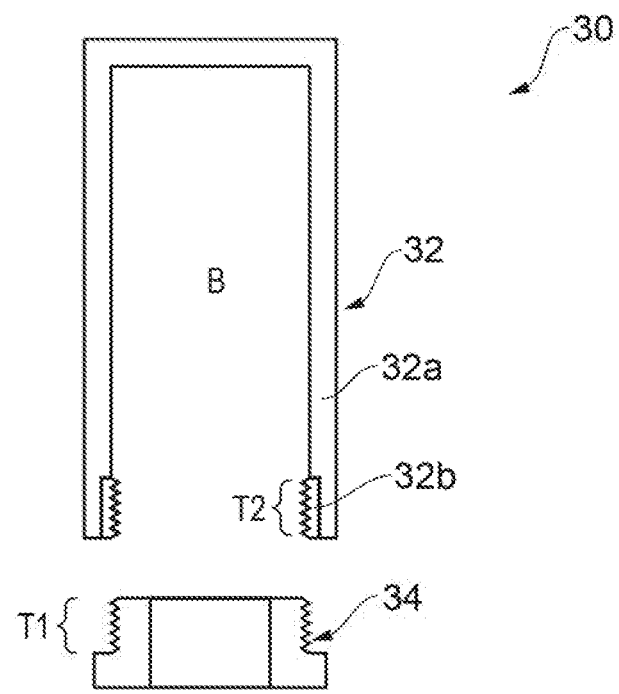
FIG. 4 is a cross section view of an aircraft assembly according to another embodiment, in which the nut is a gland nut defining a male thread.

FIG. 4 is a cross section view of an aircraft assembly 30 according to a further embodiment. In this embodiment, the assembly 30 is part of an aircraft landing gear shock absorbing strut. This embodiment is similar to the embodiments described above and for brevity the following description will focus on the differences.

The rod 32 in this case is the outer cylinder of the shock absorbing strut, which defines a bore B open at one end of the cylinder 32. The body 32a of the cylinder defines a majority of the volume of the cylinder, while an insert 32b, which is coupled to the body 32a within the bore B, defines the inwardly facing female threaded surface T2.

The nut 34 in this example is a gland nut, including a cylindrical portion which defines an outwardly facing titanium threaded surface T1.

Alternatively, the insert could be coupled to the gland nut 34 to define the male threaded surface T1.

It will be appreciated with the benefit of the present disclosure that aircraft assemblies according to embodiments of the invention can comprise various threaded rod and nut assemblies; for example, pin joints for mounting side stays, lock links, torque links, a bogie hinge pin, an outer cylinder of a shock absorbing strut and gland nut assembly, and hydraulic actuator glands nuts.

The term titanium as used herein is intended to cover aerospace grade titanium and titanium alloys such as Ti 5-5-5-3 and Ti 10-2-3.

It should be noted that the above-mentioned embodiments illustrate rather than limit the invention, and that those skilled in the art will be capable of designing many alternative embodiments without departing from the scope of the invention as defined by the appended claims.

The invention claimed is:

1. An aircraft assembly comprising:
   a titanium rod comprising a first threaded portion;
   a titanium nut comprising a second threaded portion conforming with the first threaded portion for mating engagement with the first threaded portion, wherein one of the first threaded portion and the second threaded portion defines a male thread and the other one of the first threaded portion and the second threaded portion defines a female thread such that the nut can be wound in threading engagement along the rod; and
   a threaded insert formed from a first metal of different hardness in comparison to titanium, the threaded insert being coupled to the rod or the nut to define the first threaded portion or the second threaded portion respectively such that one of the first threaded portion and the second threaded portion is formed from titanium and the other one of the first threaded portion and the second threaded portion is formed from the first metal;
   wherein the rod defines a bore, the first threaded portion defines the female threaded portion within the bore and the nut is a gland nut defining the male threaded portion, wherein the titanium rod comprises an outer cylinder of an aircraft landing gear shock absorbing strut.

2. The aircraft assembly according to claim 1, wherein the one of the first threaded portion and the second threaded portion that is formed from titanium comprises threads formed by a cold forging thread rolling process.

3. The aircraft assembly according to claim 1, wherein the body of the nut or rod to which the insert is coupled is at least 80% of the volume of the nut or rod respectively.

4. The aircraft assembly according to claim 1, wherein the insert defines the female threaded portion.

5. The aircraft assembly according to claim 1, wherein the insert comprises a self-locking thread insert.

6. The aircraft assembly according to claim 1, wherein the insert is formed from die drawn wire.

7. The aircraft assembly according to claim 1, wherein the insert is formed from a copper nickel tin alloy comprising at least 75% by weight copper and at least 15% nickel and at least 5% tin.

8. The aircraft assembly according to claim 1, wherein the first threaded portion, defined by the rod, defines the male threaded portion and the nut body defines a bore, the insert being located within the bore and defining the female threaded portion.

9. The aircraft assembly according to claim 1, wherein the titanium rod comprises an outer cylinder of an aircraft landing gear shock absorbing strut.

10. The aircraft assembly according to claim 1, wherein the insert is coupled to the rod.

11. An aircraft assembly comprising:
a titanium rod comprising a first threaded portion;
a titanium nut comprising a second threaded portion conforming with the first threaded portion for mating engagement with the first threaded portion, wherein the first threaded portion defines a male thread and the second threaded portion defines a female thread such that the nut can be wound in threading engagement along the rod; and
a threaded insert formed from a first metal of different hardness in comparison to titanium, the threaded insert being coupled to the nut to define the second threaded portion such that the first threaded portion is formed from titanium and the second threaded portion is formed from the first metal,
wherein the nut body defines a bore, the insert being located within the bore and defining the female threaded portion and wherein the titanium rod comprises an aircraft landing gear axle.

12. An aircraft assembly comprising:
a titanium rod comprising a first threaded portion;
a titanium nut comprising a second threaded portion conforming with the first threaded portion for mating engagement with the first threaded portion, wherein one of the first threaded portion and the second threaded portion defines a male thread and the other one of the first threaded portion and the second threaded portion defines a female thread such that the nut can be wound in threading engagement along the rod; and
a threaded insert formed from a first metal of different hardness in comparison to titanium, the threaded insert being coupled to the rod or the nut to define the first threaded portion or the second threaded portion respectively such that one of the first threaded portion and the second threaded portion is formed from titanium and the other one of the first threaded portion and the second threaded portion is formed from the first metal;
wherein the insert is formed from a copper nickel tin alloy comprising at least 75% by weight copper and at least 15% nickel and at least 5% tin.

* * * * *